(12) United States Patent
Lam

(10) Patent No.: US 7,093,252 B1
(45) Date of Patent: Aug. 15, 2006

(54) SELF-SUBMITTING JOB FOR TESTING A JOB SCHEDULING/SUBMITTING SOFTWARE

(75) Inventor: Thanh V. Lam, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,647

(22) Filed: Apr. 12, 2000

(51) Int. Cl.
G06F 9/46 (2006.01)
G06F 15/173 (2006.01)
G06F 3/00 (2006.01)
G06F 15/00 (2006.01)

(52) U.S. Cl. .................. 718/102; 419/314; 419/318; 419/328; 709/224; 710/8; 358/1.15

(58) Field of Classification Search ............... 709/100, 709/103, 224; 718/100–108; 719/318–328; 710/8; 358/1.15
See application file for complete search history.

(56) References Cited

U.S. PATENT DOCUMENTS

| | | | | |
|---|---|---|---|---|
| 4,918,595 A * | 4/1990 | Kahn et al. | ................ | 718/102 |
| 5,283,897 A | 2/1994 | Georgiadis et al. | | |
| 5,414,845 A * | 5/1995 | Behm et al. | ................ | 709/104 |
| 5,557,736 A * | 9/1996 | Hirosawa et al. | ................ | 714/4 |
| 5,689,625 A * | 11/1997 | Austin et al. | ................ | 358/1.15 |
| 5,752,030 A | 5/1998 | Konno et al. | | |
| 5,870,604 A | 2/1999 | Yamagishi | | |
| 5,881,284 A | 3/1999 | Kubo | | |
| 5,995,723 A * | 11/1999 | Sperry et al. | ................ | 358/1.15 |
| 6,263,358 B1 * | 7/2001 | Lee et al. | ................ | 718/100 |
| 6,470,376 B1 * | 10/2002 | Tanaka et al. | ................ | 718/108 |
| 6,496,775 B1 * | 12/2002 | McDonald et al. | ................ | 701/213 |
| 6,598,078 B1 * | 7/2003 | Ehrlich et al. | ................ | 709/224 |
| 6,658,498 B1 * | 12/2003 | Carney et al. | ................ | 710/8 |
| 2002/0080389 A1 * | 6/2002 | Carney et al. | ................ | 358/1.15 |

FOREIGN PATENT DOCUMENTS

| | | |
|---|---|---|
| GB | 2323945 | 10/1998 |
| JP | 08272626 | 10/1996 |
| JP | 10283200 | 10/1998 |
| JP | 11007431 | 1/1999 |

OTHER PUBLICATIONS

Agnihotri et al., "The Penn State Computing Condominium Scheduling System", IEEE, 1998, pp. 1-32.*
"History-Based Batch Job Scheduling on a Network of Interactively used Workstations," IBM Research Disclosure Apr. 1998, one page.

* cited by examiner

*Primary Examiner*—Meng-Al T. An
*Assistant Examiner*—Jennifer N. To
(74) *Attorney, Agent, or Firm*—Lawrence D. Cutter; Jose Gutman; Fleit, Kain, Gibbons, Gutman, Bongini & Bianco P.L.

(57) ABSTRACT

A method, and a system applying the method, for submitting an instance of a job for execution by a processor and monitoring the job instance using a state model, including the following steps. Fetching a job instance, the job instance having associated job instance activate information. Submitting the job instance to a processor. Registering the job instance activate information with a job queuing subsystem application program interface (API). Determining a state of the job instance, the job instance automatically and continuously monitoring the state while the job instance is running and when the state matches a predetermined state value the job instance submitting a subsequent job instance to the processor and registering the subsequent job instance activate information with the API. Reporting, by the API, the state of the job instance to an application. Implementing an action on the subsequent job instance based on the reported state.

15 Claims, 4 Drawing Sheets

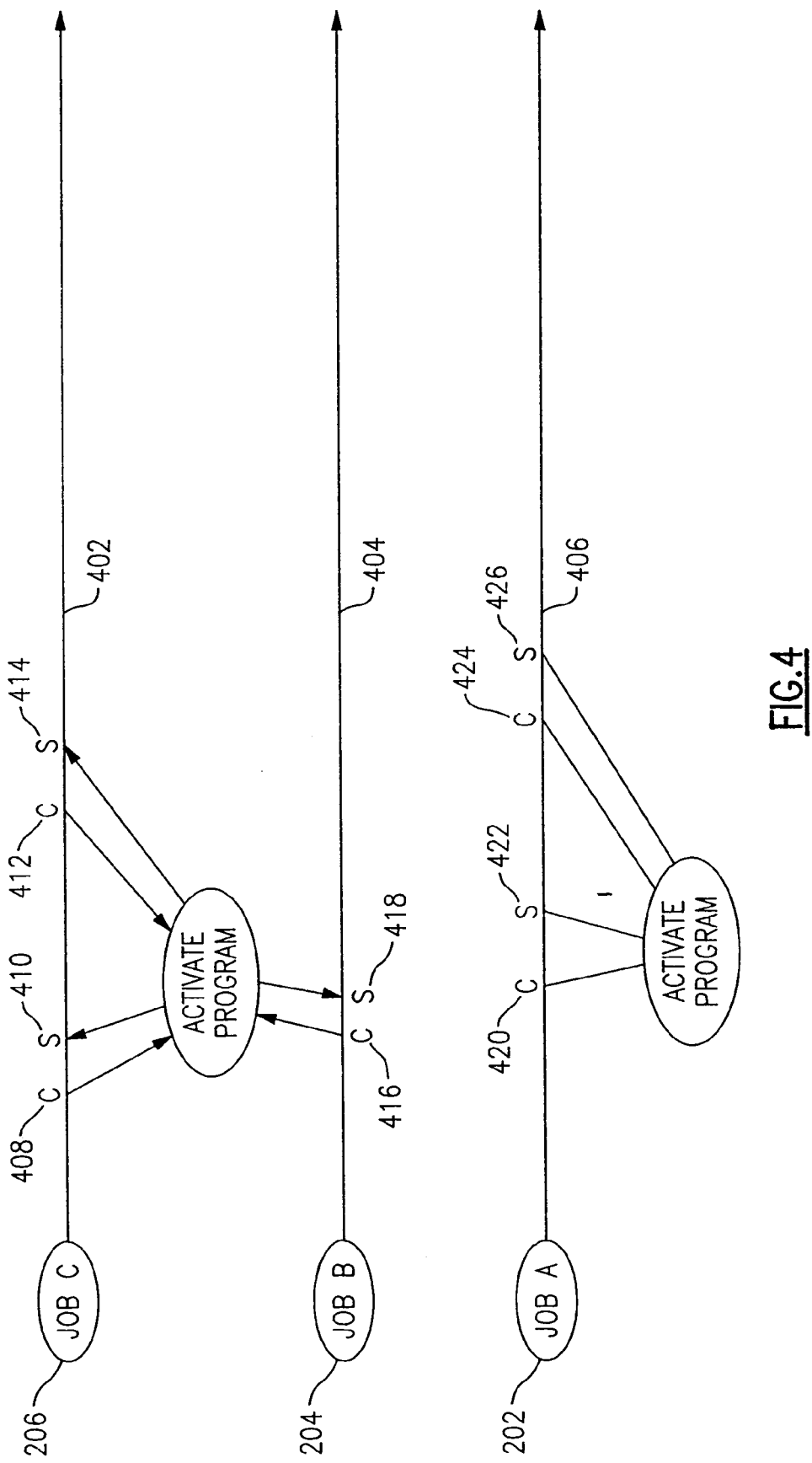

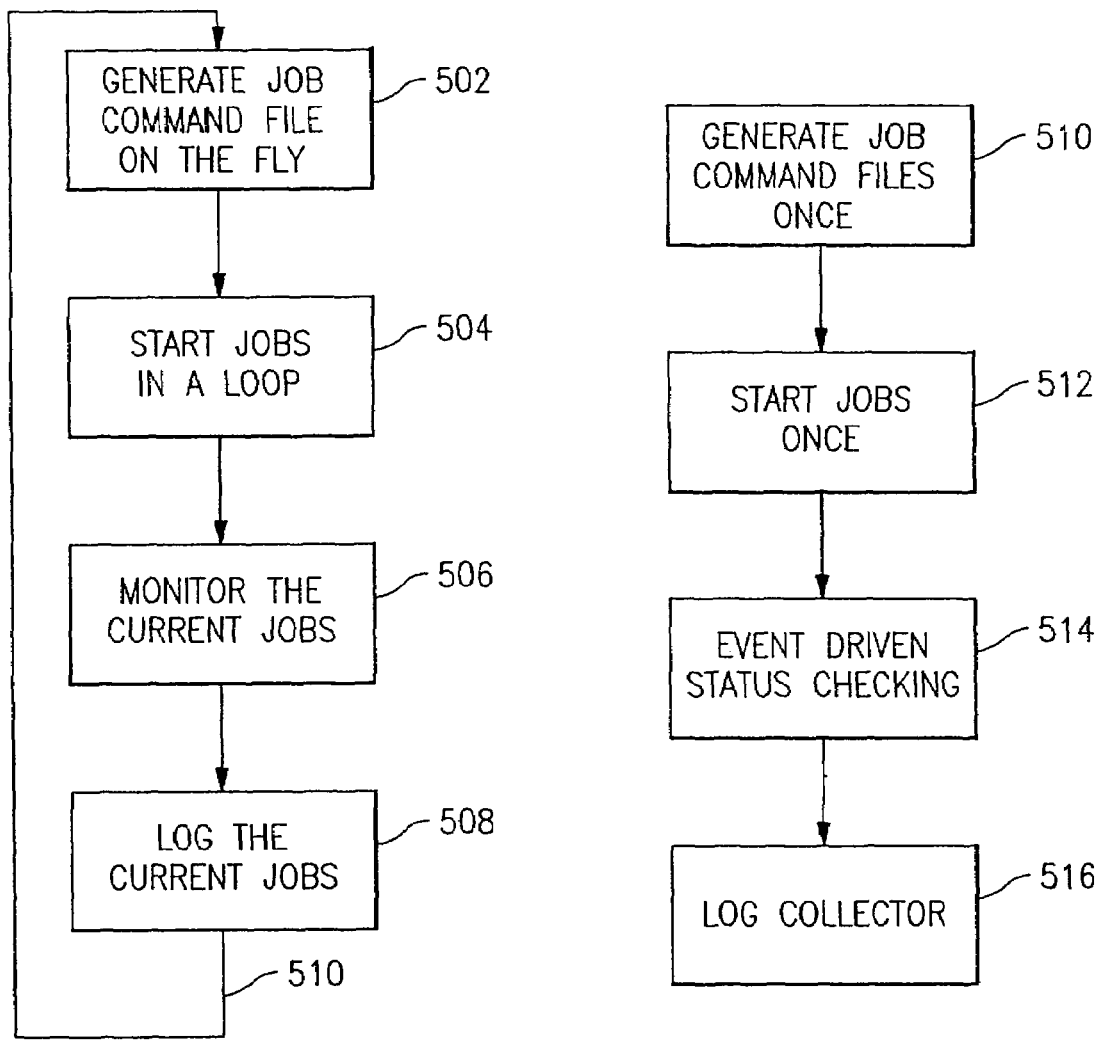

SELF-SUBMITTING JOB FOR TESTING A JOB SCHEDULING/SUBMITTING SOFTWARE

FIELD OF THE INVENTION

The following invention relates to job scheduling and submitting, and more particularly to a state based system for scheduling and submitting jobs.

TRADEMARKS

S/390 and IBM are registered trademarks of International Business Machines Corporation, Armonk, N.Y., U.S.A. and Lotus is a registered trademark of its subsidiary Lotus Development Corporation, an independent subsidiary of International Business Machines Corporation, Armonk, N.Y. Other names may be registered trademarks or product names of International Business Machines Corporation or other companies.

RELATED ART

A variety of different automated tools are used today to submit jobs to a processor. Each job can include many job instances, each instance being a subcomponent of the overall job. An exemplary job is the multiplication of hundreds of pairs of matrices, to yield a product for each pair. In this example, each pair of matrices which is separately submitted to the processor, an instance of the job. After every instance of the job (i.e., matrix pair) is submitted, the next job instance must be submitted to the processor. After completion of each instance of the job, and the production of an end result, the master process (which is also a portion of the operating system) must be informed. After all the job instances are completed, which is the end of the entire job, control is again given to the master process once again, so that a new job can be completed.

In conventional systems, it is not an easy matter to determine when each job is complete, or even when each instance of a job is complete. The job instance submitted to the processor must be polled (checked for status), to determine when one instance is complete and when another one can begin. A monitor program (or script) is constantly run, determining the status of the job and reporting back to a loop monitoring device.

This monitor program keeps track of each job, and each instance of each job, using a job identification (ID) for each job instance. The monitor program constantly polls the job scheduling processor, until it is informed that the job instance is complete. One way of determining the job is complete is by looking for a return code of zero associated with the job ID. After the loop reports back to the loop monitoring device that the job instance is complete, the loop monitoring device prompts the run program to retrieve a new job instance by calling the submit command program. At this point, the process is repeated for the next job instance.

The whole job has to be run from a few microseconds to a large number of hours (for example 72 hours), depending upon the number of job instances. The monitor program and loop monitoring device must be run constantly to determine when each job instance is complete. Many jobs can be run concurrently, so that different job instances of different jobs are run at the same time.

However, there are a number of problems associated with this loop monitoring system. In a typical scenario, polling is performed every 60 seconds, or every 30 seconds, for example. The job instances are polled one at a time (most likely sequentially or serially) by the monitor program 118. There is no guarantee that a subsequent job instance will be started right away after a first job instance is completed. The reason for this is that the statuses of all the other job instances are checked before the monitor program returns to the status of the first job instance, and it is possible, even likely, that the first job instance will have already been completed, and the processor will have been sitting idle before the monitor program returns. Consequently, because the processor sits idle, the execution of the whole job is delayed. This is called contention, because the jobs (and job instances) are effectively contending for the same processing resources.

A second problem is associated with the monitor loop, including the loop monitoring device and the monitor program. Because the programs must run continuously hour after hour, processing the jobs, these programs are processor intensive, wasteful of resources, and difficult to maintain.

A third problem is associated with a single point of failure. A job (or a test run) may include hundreds or thousands of instances, sometimes running for several days. Unfortunately, because the monitor loop runs sequentially, a failure in this single monitoring and submitting process will halt the progress of all the other job instances thereafter in the job, thereby delaying (sometimes indefinitely) the entire job.

What is needed is a to monitor the statuses of the jobs (and job instances comprising them) without the deleterious effects of loop monitoring.

SUMMARY OF THE INVENTION

The present invention is directed to a method, and a system for employing the method, for submitting an instance of a job for execution by a processor and monitoring the job instance using a state model. The method includes the steps of: (a) fetching the job instance; (b) submitting the job instance to a processor; (c) registering the job instance with an application program interface (API); (d) determining a state of the job instance; and (e) reporting the state to an application to implement an action on a subsequent job instance.

The job instance can be fetched from a job command file. The processor can be a job queuing subsystem. The registering step can include using a wraparound program to determine a register parameter for the job instance. The registering can also include: determining a register parameter for the job instance for registering the job instance with the API; and submitting the register parameter to the API.

The determining step can be performed by the API. The determining step can include any of the following: determining a started state; determining a running state; determining a completed state; determining an aborted state; and determining an idle state.

The reporting step can be performed by an activate program. In one embodiment, the state noted above is a completed state, and the action includes performing the above steps (a) through (e) for the subsequent job instance.

The invention will be understood by those skilled in the relevant art from the descriptions provided below, though various changes in form and details may be made without departing from the spirit and scope of the invention.

BRIEF DESCRIPTION OF THE DRAWINGS

The present invention will be described with reference to the accompanying drawings, wherein:

FIG. 4 is a diagram illustrating a time line of a test run associated with the block diagram of FIG. 3; and FIGS. 5A and 5B are flow charts respectively comparing the system of FIG. 1 with the inventive system of FIG. 3.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

In the following description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

By way of introduction, the present invention relates to an automated job submitting tool. The tool is used to perform runs (executions) of programs, and is applied in a number of different fields, including jobs being submitted to test systems. The jobs are various types of applications, submitted to a job queue. There can be dozens, hundreds, or thousands of jobs that are submitted. There can also be dozens, hundreds, or thousands of instances of each job that are submitted. In the present embodiment, the job itself, and other facets of the invention, are implemented by use of software (computer programs), although those skilled in the art will recognize that any know techniques, such as use of hardware, can be used instead.

By way of example, suppose a matrix multiplication must be performed. For example, suppose that hundreds of matrix pairs must be multiplied together to produce a product. Each instance of the job includes two matrices, submitted to a job queuing subsystem. The job queuing subsystem is a portion of the operating system of a computer. The entire job itself comprises the totality of jobs that are to be submitted. In actuality, it is a program, that includes the totality of job instances. After every instance of the job is submitted (i.e., matrix pair), the next job instance must be submitted to the subsystem.

After completion of each instance of the job, and the production of an end result, the master process (which is also a portion of the operating system) must be informed. The monitoring process (or processes) must see that every job instance completes and that a new job instance is started.

Figure 1:
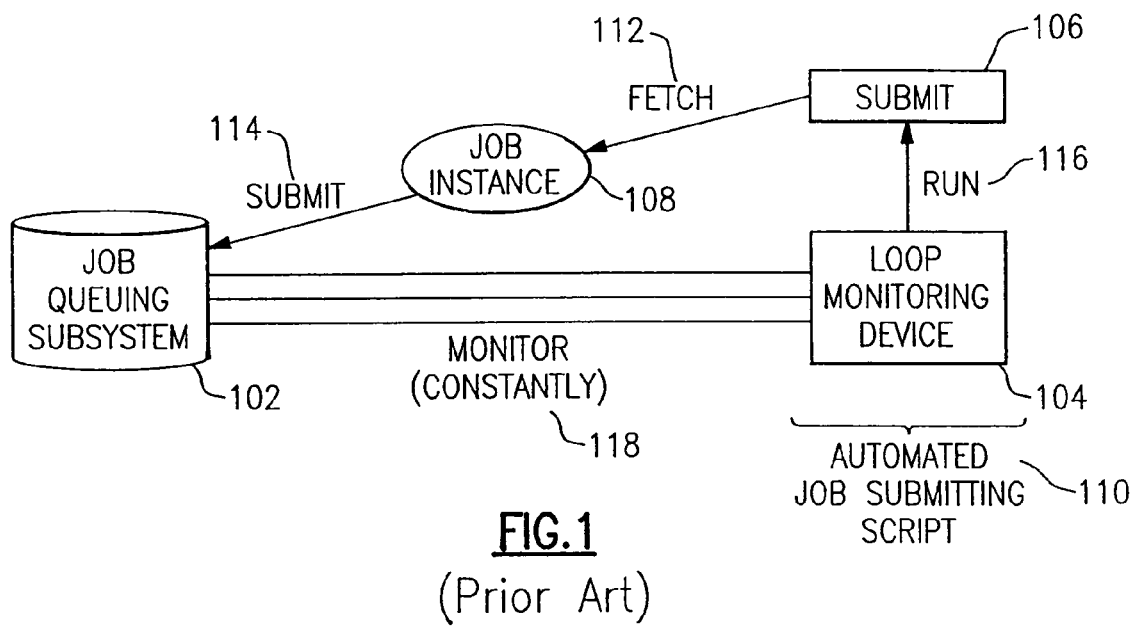
FIG. 1 is a block diagram illustrating a high level overview for submitting a job.

FIG. 1 is a block diagram illustrating a high level overview for a known job submitting system. FIG. 1 includes a job queuing (submitting) subsystem 102, an automated job submitting script 110 (which comprises a loop monitoring device 104 and a submit command program 106), a job instance 108, and a series of commands. The commands include the submit command 114, the fetch command 112, the run command 116, and the monitor (constantly) command 118. In the present embodiment, the commands are instances of software running on a computer, or alternatively calls made by one program module to another, although those skilled in the art will recognize that any other types of commands can be used as well. In addition, in the present embodiment, the job queuing subsystem 102, the loop monitoring device 104, the job instance 108, and the submit command 106 are instances of software running on a computer, or alternatively calls made by one program module to another, although those skilled in the art will also recognize that any other known techniques can be used as well. Hence, the block diagram of FIG. 1 (as well as FIG. 3 below) is conceptual in nature, and should not be viewed as limiting the present invention to its particular implementation.

The automated job submitting script 110 comprises software used to submit and monitor the instances of the job. In order to submit a job, a user or a tester (working in a test environment for example) writes script 110 to call the submit command 106 to submit a first job instance 108. The script 110 will fetch the job instance (file) from the disk, in order to submit it to the job queuing subsystem 102. Job instance 108 is an instance of the entire-job, and not the entire job itself. The submit command 106 uses the fetch program 112 to fetch the job instance 108. There is a job command file (not shown), from which the fetch command 106 fetches the job instance job 108. The job instance 108 is then submitted to the job queuing subsystem 102 via submit program 114. As noted, the job queuing subsystem 102 is a part of the operating system. The job queuing subsystem 102 submits the job 108 to the portion of the operating system (not shown) which performs the calculations involved (for example, the matrix multiplication). After the calculations for the job instance 108 are complete, this information must be reported so that a new job instance can be run.

In the convention model, it is not easily possible to determine when each job instance 108 is complete, so that the next job instance can be submitted to the job queuing subsystem 102. For this reason, a monitor program (or script) 118 is constantly run, determining the status of the job and reporting back to the loop monitoring device 104. The monitor program keeps track of each job, and each instance of each job 108, using a job identification (ID) for each job instance. The monitor program 118 constantly polls job queuing subsystem 102, until it is informed that the job instance 108 is complete. One way of determining that the job is complete is by looking for a return code of zero associated with the job ID. After the loop reports back to loop monitoring device 104 that the job instance 108 is complete, the loop monitoring device 104 prompts the run program 116 to retrieve a new job instance by calling the submit command program 106. At this point, the process detailed above is repeated.

Figure 2:
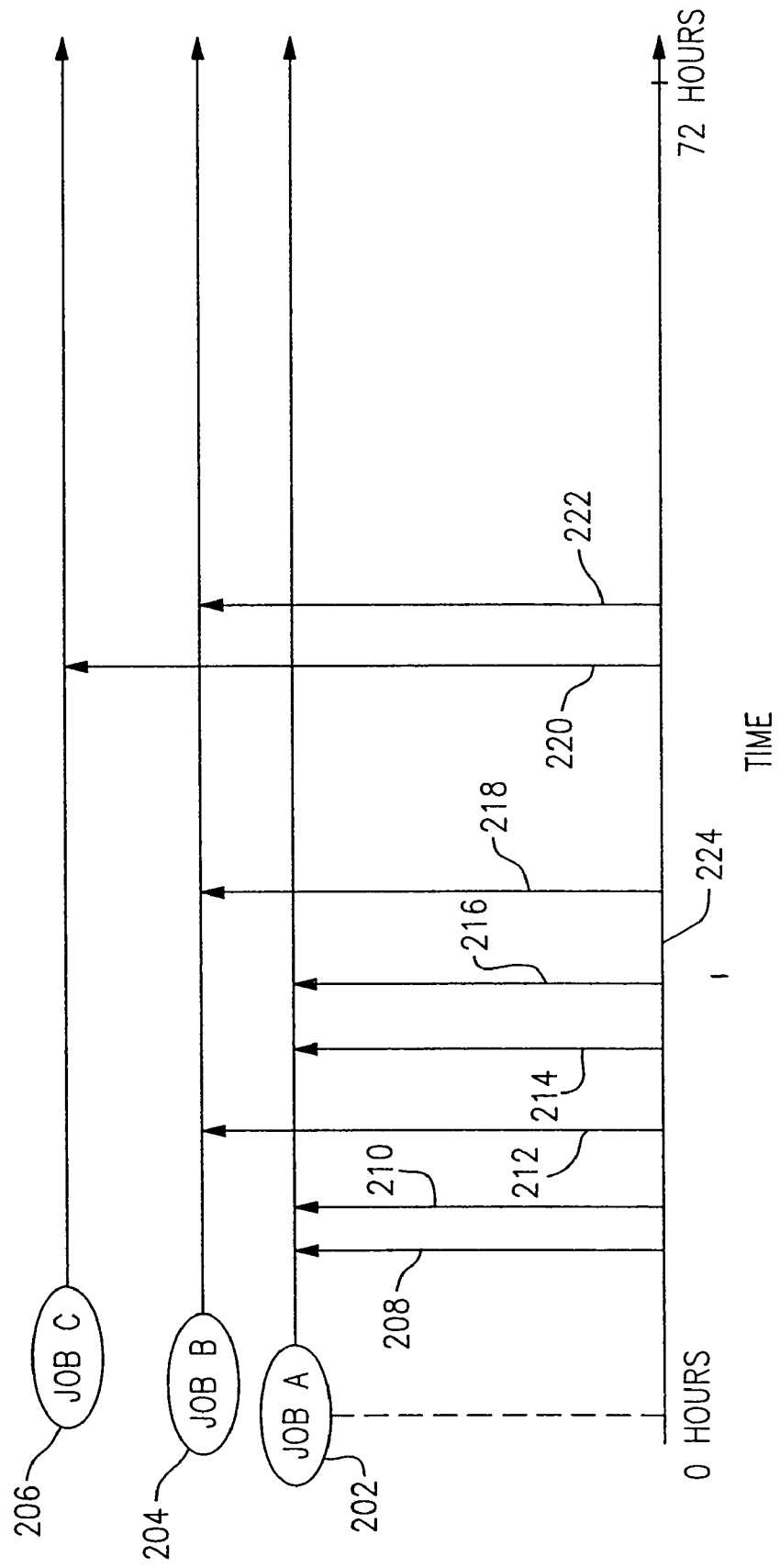
FIG. 2 is a diagram illustrating a time line of a test run associated with the block diagram of FIG. 1.

It must be noted that the whole job has to be run from a few microseconds to a large number of hours (for example 72 hours), depending upon the number of job instances. The monitor program 118 and loop monitoring device 104 must be run constantly to determine when each job instance is complete. It should also be noted that many jobs can be run concurrently, so that different job instances of different jobs are run at the same time. This concept is illustrated in FIG. 2. FIG. 2 is a diagram illustrating a time line of a test run associated with the block diagram of FIG. 1. The abscissa represents time, and is accordingly labeled, beginning with t=0 hours and ending with t=72 hours. The abscissa also shows the monitor "loop" 224, which must keep running for all the jobs. Three jobs, job A 202, job B 204, and job C 206 are illustrated, each having horizontal arrows in the direction of time, to indicate progression and completion of the jobs. Polling lines 208–222 are also illustrated as arising from the monitor loop 224, which are where the monitor program 118 polls the jobs to determine the status of the particular instances of each of the jobs 202, 204, 206, to determine whether the jobs are completed. The individuals jobs 202–206 have unique start and stop times (not shown).

There are a number of problems associated with the system illustrated in FIGS. 1 and 2. In a typical scenario, polling is performed every 60 seconds, or every 30 seconds, for example. The job instances are polled one at a time (most likely sequentially or serially) by the monitor program 118. There is no guarantee that a subsequent job instance will be started right away after a first job instance is completed. The reason for this is that the statuses of all the other job instances are checked before the monitor program returns to the status of the first job instance, and it is possible, even likely, that the first job instance will have already been completed, and the processor will have been sitting idle before the monitor program returns. Consequently, because the processor sits idle, the execution of the whole job is delayed. This is called contention, because the jobs (and job instances) are effectively contending for the same processing resources.

A second problem is associated with the monitor loop, including the loop monitoring device 104 and the monitor program 118. Because the programs must run continuously hour after hour, processing the jobs, these programs are processor intensive, wasteful of resources, and difficult to maintain.

A third problem is associated with a single point of failure. A single job may include hundreds or thousands of instances, sometimes running for several days. Unfortunately, because the monitor loop runs sequentially, a failure in this single monitoring and submitting process will halt the progress of all the other job instances thereafter, thereby delaying (sometimes indefinitely) the entire job.

Figure 3:
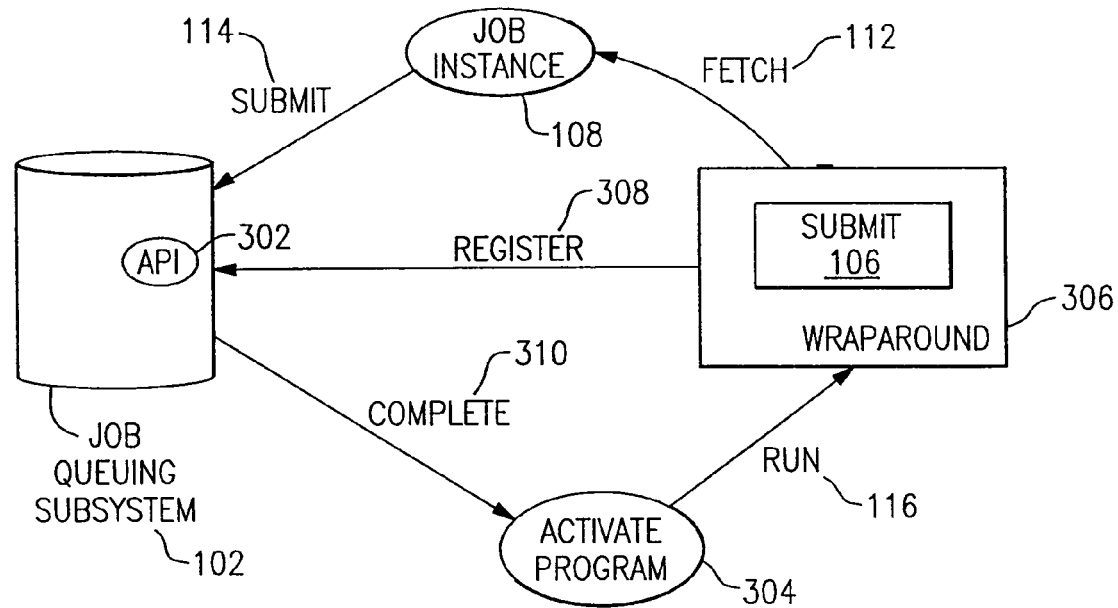
FIG. 3 is a block diagram illustrating a self-submitting job overview.

FIG. 3 is a block diagram illustrating a self-submitting job of the present invention. Similarly to the overview of FIG. 1, this figure includes the job queuing subsystem 102, submit command 106, run program 116, fetch program 112, submit program 114, and job instance 108. However, the monitor loop has been replaced with an event driven model. The components serving to make the model event driven include (1) an application program interface (API), (2) a register procedure 308, (3) a complete procedure 310, (4) an activate program 304 and (5) a wraparound program 306.

In the system of FIG. 3, a user or a tester writes a script (not labeled) to call the submit command 106 to submit a first job instance 108. The script will fetch the job instance (file) from the disk, in order to submit it to the job queuing subsystem 102. The submit command 106 uses the fetch program 112 to fetch the job instance 108 from a job command file. (The job instance 108 is then submitted to the job queuing subsystem 102 via submit program 114.) The job queuing subsystem 102 submits the job 108 to the portion of the operating system (not shown) which performs the calculations involved.

In addition, however, in the system of FIG. 3 a wraparound program 306 is executed, either concurrently with or separately from execution of the submit command 106. The wraparound program is a function that cooperates with and communicates with the submit command 106, and is therefore said to conceptually "wrap around" the submit command 306. The wraparound program, determines a register parameter for the job instance 108, and submits this register parameter to the API program 302. This is performed by execution of register procedure 308.

API 302, which runs on the processor and is in communication with the job queuing subsystem 102, is thus used to determine the job status or "state." Exemplary states include the following: (1) started (the job instance has been started); (2) running (the job instance is being executed); (3) complete (the job instance is finished); (4) aborted (the job instance has been aborted due to internal or external problems); and (5) idle (the processor is incomplete, and the processor is sitting idle for the job instance).

The API 302 reports the job state to the activate program 304. If the job instance is complete, i.e., the job state is "complete," then this is reported. The activate program receives the state of the job instance from API 302. Only when the job instance is complete does the activate program execute the run program 116 to submit the next job instance. Consequently, the activate program 304 (and accompanying program modules) lay dormant, not having to continuously execute or poll the status of the job queuing subsystem 102.

The registration procedure allows the API to keep a record of the job instances. The fact that the states of the job instances are reported directly to the activate program removes the need for polling and monitoring. Appendix 1 (one sheet) includes an exemplary Activate Program. Appendix 2 (three sheets) includes an exemplary wraparound program 106, which includes function calls to the submit command module 106. Although in the embodiment shown, these programs are written in the "C" language, those skilled in the art will recognize that any language can be used, which can run on any platform, and that additionally alternatively approaches (such as the use of hardware) can be used instead.

As noted, in the present embodiment the job instance itself is a program. When it is completed, in one embodiment, the job instance informs the API 302 of its state. It is this state that the API reports to the activate program 304. This can be done via an interface between the job and the API 302, which eliminates the need for setting a return code (to zero for example) and having to look for the state in an output file (which the monitor loop of the FIG. 1 embodiment must perform).

In one embodiment, the actual program output can be determined by running a check program (not shown). This check program is given information regarding where to find the output results. The activate program 304 calls the check program, which in turn uses a job instance identifier and the location of output to find the results, and determine whether the results are good. If the results are good, the activate program 304 is permitted to continue processing.

The main advantage is that the problems enumerated above, namely: (1) the contention for resources; (2) the wastefulness of the monitor loop; and (3) the single point of failure, are removed with the event driven model of the present invention. In addition, in the present invention, the submit command 106 is only executed once for the entire job (including all the job instances), because of the presence of the wraparound program 306. Subsequent submission of job instance 108 is automatically triggered by the activate program 304.

FIG. 4 is a diagram illustrating time lines of test runs associated with the block diagram of FIG. 3. Shown are job A 202, job B 204, and job C 206, and activate program 304.

There are three abscissa, labeled 402, 406 and 408, one for each job. These abscissa also represent time, but unlike FIG. 2, are not associated with any monitor loops. Referring to job C 206, as time proceeds forward in completion of the job, there is no monitoring or polling associated with the status of the job. A first job instance is completed at 408 (labeled "C"), which is immediately reported to the activate program 304, and a second job instance is immediately started at 410 (labeled "S") by activate program 304. This second job instance is completed at 412, which is reported to activate program 304, and a third job is immediately started by activate program 304 at 414. Job B 204 and Job A 202 similarly show complete ("C") points 416, 420, 424 and start ("S") points 418, 422 and 426, respectively. Since the activate program receives completion status directly, and implements a new start status as soon as the completion status is received, there is no need for monitoring of the status.

FIGS. 5A and 5B compare the known system of FIG. 1 with the inventive system of FIG. 3, respectively. In step 502 of FIG. 5A, in the system of FIG. 1, the job command file is generated on the fly. In step 510 of FIG. 5B, in the system of FIG. 3, the job command file is generated only once, and can be used by any number of processes anytime.

In step 504 of FIG. 5A, in the system of FIG. 1, the job instances of a job are started and executed in a loop, which continues to receive each new job instance sequentially. In step 512 of FIG. 5B, in the system of FIG. 3, however, because of the wraparound program 306 the job instances are started one time at the beginning of the job.

In step 506 of FIG. 5A, the job instances are monitored by the noted polling technique. In step 514, however, the job instances are event driven by interaction between the API 302 and the activate program 304.

In step 508 of FIG. 5A, the single monitor loop has to make sure the results of all job instances are logged. In step 516, however, the activate program can start the job log program after a job instance completes and before a new job instance is started. Here again is the event driven model in which the job log program lay dormant and is only run by the activate program when a job instance completes. The log collector can clean up the job instance output files, or log once every certain time interval. This job log information can be included in the job command files. A timestamp option can be used to specify for how long the logs should be kept from the current running of the jobs.

Finally, FIG. 5A includes a loop back, to retrieve and process the next job instance. However, because in the present invention job information is wrapped and passed from one instance to the next, no loop back is required in FIG. 5B.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for submitting an instance of a job for execution by a processor and monitoring the job instance using a state model, comprising the steps of:
   fetching a job instance, the job instance having associated job instance activate information;
   submitting the job instance to a processor;
   registering the job instance activate information with a job queuing subsystem application program interface (API) that runs on the processor;
   determining, at the API, a state of the job instance, the job instance automatically and continuously monitoring the state while the job instance is running and when the state matches a pre-determined state value the job instance submitting a subsequent job instance to the processor and registering the subsequent job instance activate information with the API that runs on the processor, wherein the subsequent job instance is any subsequent job instance;
   reporting, by the API, said state of the job instance to an application; and
   implementing an action on the subsequent job instance based on the reported state of the job instance.

2. The method according to claim 1, wherein the job instance is fetched from a job command file.

3. The method according to claim 1, wherein said processor is a job queuing subsystem.

4. The method according to claim 1, wherein said registering step comprises:
   using a wraparound program to determine a register parameter for the job instance.

5. The method according to claim 1, wherein said registering step comprises:
   determining a register parameter for the job instance for registering the job instance with said API; and
   submitting said register parameter to said API.

6. The method according to claim 1, wherein said determining step is performed by said API.

7. The method according to claim 1, wherein said determining step comprises any one of:
   determining a started state;
   determining a running state;
   determining a completed state;
   determining an aborted state; and
   determining an idle state.

8. The method according to claim 1, wherein said reporting step is performed by an activate program.

9. The method according to claim 1, wherein said state is a completed state, and wherein said action comprises performing all of said steps for said subsequent job instance.

10. The method of claim 1, wherein:
    the determining, at the API, of the state of the job instance, comprises the job instance automatically monitoring in an event driven model the state while the job instance is running and when the state matches a predetermined state value the job instance submitting a subsequent job instance to the processor and registering the subsequent job instance activate information with the API that runs on the processor, wherein the subsequent job instance is any subsequent job instance.

11. A system for submitting an instance of a job for execution by a processor and monitoring the job instance using a state model, comprising:
    device that fetches the job instance, the job instance having associated job instance activate information;
    device that submits a job instance to a processor;
    device that registers the job instance activate information with a job queuing subsystem application program interface (API) that runs on the processor;
    device that determines, at the API, a state of the job instance;
    device for the job instance to automatically and continuously monitor the state while the job instance is running and when the state matches a predetermined state a subsequent job instance is submitted to the processor and its activate information is registered with the API that runs on the processor, wherein the subsequent job instance is any subsequent job instance;

device that reports, by the API, said state of the job instance to an application; and device that implements an action on the subsequent job instance based on the reported state of the job instance.

12. The system of claim 11, wherein:

the device for the job instance automatically and periodically monitors the state while the job instance is running and when the state matches a predetermined state a subsequent job instance is submitted to the processor and its activate information is registered with the API that runs on the processor, wherein the subsequent job instance is any subsequent job instance.

13. The system of claim 11, wherein:

the device for the job instance automatically monitors in an event driven model the state while the job instance is running and when the state matches a predetermined state a subsequent job instance is submitted to the processor and its activate information is registered with the API that runs on the processor, wherein the subsequent job instance is any subsequent job instance.

14. A program storage device readable by a machine, tangibly embodying a program of instructions executable by the machine for submitting an instance of a job for execution by a processor and monitoring the job instance using a state model, comprising:

enabling a computer program to fetch a job instance, the job instance having associated job instance activate information;

enabling a computer program to submit the job instance to a processor;

enabling a computer program to register the job instance activate information with a job queuing subsystem application program interface (API) that runs on the processor;

enabling a computer program to determine, at the API, a state of the job instance, the job instance automatically and continuously monitoring the state while the job instance is running and when the state matches a pre-determined state value the job instance submitting a subsequent job instance to the processor and registering the subsequent job instance activate information with the API that runs on the processor, wherein the subsequent job instance is any subsequent job instance;

enabling a computer program to report, by the API, said state of the job instance to an application; and implementing an action on the subsequent job instance based on the reported state of the job instance.

15. The method of claim 1, wherein:

the determining, at the API, of the state of the job instance, comprises the job instance automatically and periodically monitoring the state while the job instance is running and when the state matches a pre-determined state value the job instance submitting a subsequent job instance to the processor and registering the subsequent job instance activate information with the API that runs on the processor, wherein the subsequent job instance is any subsequent job instance.

* * * * *